United States Patent
Zhang et al.

(10) Patent No.: US 12,430,409 B2
(45) Date of Patent: Sep. 30, 2025

(54) THIRD PARTY BASED PIRATED COPY TRACING

(71) Applicant: Microsoft Technology Licensing, LLC, Redmond, WA (US)

(72) Inventors: Xian Zhang, Redmond, WA (US); Xiaobing Guo, Redmond, WA (US); Yang Chen, Redmond, WA (US); Shuo Chen, Livingston, NJ (US); Zhongxin Guo, Redmond, WA (US); Qiufeng Yin, Redmond, WA (US); Mao Yang, Redmond, WA (US); Lidong Zhou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 17/926,997

(22) PCT Filed: May 10, 2021

(86) PCT No.: PCT/US2021/031464
§ 371 (c)(1),
(2) Date: Nov. 22, 2022

(87) PCT Pub. No.: WO2022/005609
PCT Pub. Date: Jan. 6, 2022

(65) Prior Publication Data
US 2023/0205851 A1    Jun. 29, 2023

(30) Foreign Application Priority Data
Jun. 29, 2020 (CN) .......................... 202010611319.3

(51) Int. Cl.
*G06F 21/10* (2013.01)

(52) U.S. Cl.
CPC .......... *G06F 21/105* (2013.01); *G06F 21/106* (2023.08)

(58) Field of Classification Search
CPC ........ G06F 21/10; G06F 21/16; G06F 21/105; G06F 21/106; H04L 9/50; H04L 9/3239; H04L 63/00; G06Q 30/0185
See application file for complete search history.

(56) References Cited

U.S. PATENT DOCUMENTS

| | | | |
|---|---|---|---|
| 9,031,323 B2 * | 5/2015 | Koushik | G06V 20/48 382/209 |
| 2013/0232339 A1 * | 9/2013 | Ignatchenko | H04N 21/2347 713/171 |

(Continued)

FOREIGN PATENT DOCUMENTS

| | | | |
|---|---|---|---|
| CN | 101794363 A | | 8/2010 |
| CN | 107086977 A | * | 8/2017 |
| WO | 2015059669 A1 | | 4/2015 |

OTHER PUBLICATIONS

"Sila's Corporate Content Anti-Piracy Program a New Cause of Concern for Small-to-Medium Businesses"—Sila Audits, Scott & Scott LLP, Aug. 13, 2008 https://scottandscottllp.com/siias-corporate-content-anti-piracy-program-a-new-cause-of-concern-for-small-to-medium-businesses/ (Year: 2008).*

(Continued)

*Primary Examiner* — Randy A Scott
(74) *Attorney, Agent, or Firm* — Schwegman Lundberg & Woessner, P.A.

(57) ABSTRACT

According to implementations of the subject matter described herein, a solution is provided for pirated copy tracing based on a third party. In the solution, a report on a pirated copy of a digital content is received from a third party, wherein the report comprises first secret information for characterizing a first identification, time information and (Continued)

tracing information of the pirated copy. Subsequently, a request for verifying the report is received to determine whether the report is valid. When the report is determined as valid, a licensee associated with the report is marked as a first status to indicate that the pirated copy might be leaked by the licensee. Therefore, the pirated copy may be effectively traced based on third parties. The tracing information in the report can be hidden, and other third parties can therefore be prevented from using the tracing information for duplicate reports.

20 Claims, 5 Drawing Sheets

(56) References Cited

U.S. PATENT DOCUMENTS

| | | | |
|---|---|---|---|
| 2014/0283123 | A1 | 9/2014 | Lonstein et al. |
| 2016/0034914 | A1 | 2/2016 | Gonen et al. |
| 2017/0337534 | A1 | 11/2017 | Goeringer et al. |
| 2019/0012439 | A1* | 1/2019 | Munro ................ G06Q 30/02 |
| 2020/0012765 | A1 | 1/2020 | Smaiely et al. |
| 2020/0143014 | A1 | 5/2020 | Lebeau et al. |
| 2020/0226233 | A1* | 7/2020 | Penugonda .......... H04L 9/3239 |

OTHER PUBLICATIONS

"Siia Reaches Content Piracy Settlement on Behalf of Providence Publications"—PR Newswire, Sep. 6, 2011 https://www.prnewswire.com/news-releases/siia-reaches-content-piracy-settlement-on-behalf-of-providence-publications-129294073.html (Year: 2011).*
"BSA—The Software Alliance", Retrieved From: https://web.archive.org/web/20191231003448/https://reporting.bsa.org/r/report/add.aspx?src=US&ln=en-us, Dec. 31, 2019, 5 Pages.
"Copyright Law of the United States", Retrieved From: https://web.archive.org/web/20170206163918/https://www.copyright.gov/title17/title17.pdf, Dec. 2016, 367 Pages.
"Custos", Retrieved From: https://web.archive.org/web/20200512111049/https:/www.custostech.com/, May 12, 2020, 2 Pages.
"Geth", Retrieved From: https://web.archive.org/web/20190425135704/https://github.com/ethereum/go-ethereum/wiki/geth, Dec. 21, 2017, 5 Pages.
"Ropsten Testnet Explorer", Retrieved From: https://web.archive.org/web/20200518211358/https:/ropsten.etherscan.io/, May 18, 2020, 1 Page.
"Siia's Corporate Anti-Piracy Reward Program", Retrieved From: https://web.archive.org/web/20191117204451/https://www.siia.net/piracy/report/tos.asp, Nov. 17, 2019, 2 Pages.
"Sweet Tools for Smart Contracts", Retrieved From: https://web.archive.org/web/20200511182201/https://www.trufflesuite.com/, May 11, 2020, 3 Pages.
"The Federation Against Copyright Theft", Retrieved From: https://web.archive.org/web/20200511201038/https:/www.fact-uk.org.uk/, May 11, 2020, 4 Pages.
"Veredictum", Retrieved From: https://web.archive.org/web/20180830041932/https:/www.veredictum.io/, Aug. 30, 2018, 4 Pages.
Adi, et al., "Turning Your Weakness Into a Strength: Watermarking Deep Neural Networks by Backdooring", in Proceedings of 27th USENIX Security Symposium, Aug. 15, 2018, pp. 1615-1631.
Agrawal, et al., "Watermarking Relational Databases", in Proceedings of 28th International Conference on Very Large Databases, Aug. 20, 2002, 12 Pages.
Aguilar-Melchor, et al., "XPIR : Private Information Retrieval for Everyone", in Proceedings on Privacy Enhancing Technologies, Issue 2, Apr. 1, 2016, pp. 155-174.
Biryukov, et al., "Equihash: Asymmetric Proof-of-Work Based on the Generalized Birthday Problem", in Proceedings of 23rd Annual Network and Distributed System Security Symposium, Feb. 21, 2016, 13 Pages.

Bjorklund, Johan, "A Buyer-Seller Protocol with Watermarking for Cloud Streaming", in Degree Project in Engineering and Economics, Jun. 2017, 76 Pages.
Boneh, et al., "Collusion-Secure Fingerprinting for Digital Data", in Journal of IEEE Transactions on Information Theory, vol. 44, Issue 5, Sep. 1998, pp. 1897-1905.
Brassard, et al., "Minimum Disclosure Proofs of Knowledge", in Journal of Computer and System Sciences, vol. 37, Issue 2, Oct. 1, 1988, pp. 156-189.
Breidenbach, et al., "Enter the Hydra: Towards Principled Bug Bounties and Exploit-Resistant Smart Contracts", in Proceedings of 27th USENIX Security Symposium, Aug. 15, 2018, pp. 1335-1352.
Charpentier, et al., "An Asymmetric Fingerprinting Scheme Based on Tardos Codes", in Proceedings of International Workshop on Information Hiding, May 18, 2011, pp. 43-58.
Chor, et al., "Tracing Traitors", in Proceedings of 14th Annual International Cryptology Conference, Aug. 21, 1994, pp. 257-270.
Chriseth, et al., "The Solidity Contract-Oriented Programming Language", Retrieved From: https://web.archive.org/web/20180518172624/https://github.com/ethereum/solidity, May 18, 2018, 2 Pages.
Collberg, et al., "Dynamic Path-Based Software Watermarking", in Proceedings of ACM SIGPLAN Conference on Programming Language Design and Implementation, Jun. 9, 2004, pp. 107-118.
Cox, et al., "Secure Spread Spectrum Watermarking for Images, Audio and Video", in Proceedings of 3rd IEEE International Conference on Image Processing, Sep. 19, 1996, pp. 243-246.
Cox, et al., "Secure Spread Spectrum Watermarking for Multimedia", in Journal of IEEE Transactions on Image Processing, vol. 6, Issue 12, Dec. 1997, pp. 1673-1687.
Devegili, et al., "Implementing Cryptographic Pairings over Barreto-Naehrig Curves", in Proceedings of International Conference on Pairing-Based Cryptography, Jul. 2, 2007, pp. 197-207.
Dziembowski, et al., "FairSwap: How to Fairly Exchange Digital Goods", in Proceedings of ACM SIGSAC Conference on Computer and Communications Security, Oct. 15, 2018, 18 Pages.
Eggerton, John, "Pallone: Google, Facebook, Twitter Content Treatment Not 'Neutral'", Retrieved From: https://web.archive.org/web/20200807220106/https://www.multichannel.com/news/pallone-google-facebook-twitter-content-treatment-not-neutral-416099, Oct. 23, 2017, 2 Pages.
Gervais, et al., "On the Security and Performance of Proof of Work Blockchains", in Proceedings of the ACM SIGSAC Conference on Computer and Communications Security, Oct. 24, 2016, pp. 3-16.
Hu, et al., "Asymmetric Fingerprinting Based on 1-out-of-n Oblivious Transfer", in Journal of IEEE Communications Letters, vol. 14, Issue 5, May 2010, pp. 453-455.
Kalodner, et al., "Arbitrum: Scalable, Private Smart Contracts", in Proceedings of 27th USENIX Security Symposium, Aug. 15, 2018, pp. 1353-1370.
Kalra, et al., "ZEUS: Analyzing Safety of Smart Contracts", in Proceedings of 25th Annual Network and Distributed System Security Symposium, Feb. 18, 2018, 15 Pages.
Khalil, et al., "TEX—A Securely Scalable Trustless Exchange", in Journal of IACR Cryptology ePrint Archive, 2019, 17 Pages.
Kiayias, et al., "Communication Optimal Tardos-Based Asymmetric Fingerprinting", in Proceedings of Cryptographers' Track at the RSA Conference, Apr. 21, 2015, pp. 469-486.
Kim, et al., "An Asymmetric Watermarking System With Many Embedding Watermarks Corresponding to One Detection Watermark", in Journal of IEEE Signal Processing Letters, vol. 11, Issue 3, Mar. 2004, pp. 375-377.
King, et al., "PPCoin: Peer-to-Peer Crypto-Currency with Proof-of-Stake", in Journal of Self-Published Paper, vol. 19, Issue 1, Aug. 19, 2012, 6 Pages.
Koch, et al., "A Predictable Incentive Mechanism for TrueBit", in Repository of arXiv:1806.11476v1, Jun. 29, 2018, 6 Pages.
Krupp, et al., "Teether: Gnawing at Ethereum to Automatically Exploit Smart Contracts", in Proceedings of 27th USENIX Security Symposium, Aug. 15, 2018, pp. 1317-1333.
Lin, et al., "Sybil-Proof Incentive Mechanisms for Crowdsensing", in Proceedings of IEEE Conference on Computer Communications, May 1, 2017, 9 Pages.

(56) References Cited

OTHER PUBLICATIONS

Linnartz, et al., "Analysis of the Sensitivity Attack against Electronic Watermarks in Images", in Proceedings of International Workshop on Information Hiding, Apr. 14, 1998, 15 Pages.

Luu, et al., "Making Smart Contracts Smarter", in Proceedings of ACM SIGSAC Conference on Computer and Communications Security, Oct. 24, 2016, pp. 254-269.

"International Search Report and Written Opinion Issued in PCT Application No. PCT/US21/031464", Mailed Date: Aug. 23, 2021, 12 Pages.

Poon, et al., "Plasma: Scalable Autonomous Smart Contracts", in Journal of White Paper, Aug. 11, 2017, 47 Pages.

Qureshi, et al., "PSUM: Peer-to-Peer Multimedia Content Distribution using Collusion-Resistant Fingerprinting", in Repository of arXiv:1703.01820v1, Mar. 6, 2017, 37 Pages.

Rindal, et al., "libOTe: An Efficient, Portable, and Easy to Use Oblivious Transfer Library", Retrieved From: https://web.archive.org/web/20180613071113/https:/github.com/osu-crypto/libOTe, Jun. 13, 2018, 5 Pages.

Schor, Lukas, "On Zero-Knowledge Proofs in Blockchains", Retrieved From: https://schor.medium.com/on-zero-knowledge-proofs-in-blockchains-14c48cfd1dd1, Mar. 23, 2018, 5 Pages.

Scott, et al., "Multiprecision Integer and Rational Arithmetic Cryptographic Library (MIRACL)", Retrieved From: https://github.com/miracl/MIRACL, Aug. 21, 2019, 4 Pages.

Tardos, Gabor, "Optimal Probabilistic Fingerprint Codes", in Journal of the ACM (JACM), vol. 55, Issue 2, May 15, 2008, 24 Pages.

Trappe, et al., "Anti-Collusion Fingerprinting for Multimedia", in Journal of IEEE Transactions on Signal Processing, vol. 51, Issue 4, Apr. 2003, pp. 1069-1087.

Wagner, Nealr. , "Fingerprinting", in Proceedings of IEEE Symposium on Security and Privacy, Apr. 25, 1983, pp. 18-22.

Wailgum, Thomas, "Has Anyone Received the BSA's $1M Software Piracy Reward?", Retrieved From: https://web.archive.org/web/20170829115923/http://www.pcworld.com/article/147448/article.html, Jun. 23, 2008, 2 Pages.

Xu, et al., "Solutions to the Anti-Piracy Problem in Oblivious Transfer", in Journal of Computer and System Sciences, vol. 82, Issue 3, May 1, 2016, pp. 466-476.

"Ethereum", Retrieved from: https://web.archive.org/web/20200520081437/https:/ethereum.org/, May 20, 2020, 2 Pages.

"Web3.js—Ethereum Javascript API", Retrieved From: https://web3js.readthedocs.io/en/v1.2.2/, Retrieved On: Apr. 8, 2019, 7 Pages.

Adeyanju, Craig, "Blockchain in Media: How Can Blockchain Fight Piracy?", Retrieved From: https://cointelegraph.com/news/blockchain-in-media-how-can-blockchain-fight-piracy, Aug. 8, 2018, 10 Pages.

Ben-Sasson, et al., "Succinct Non-Interactive Zero Knowledge for a von Neumann Architecture", in Proceedings of 23rd USENIX Security Symposium, Aug. 20, 2014, pp. 781-796.

Ben-Sasson, et al., "Zerocash: Decentralized Anonymous Payments from Bitcoin", in Proceedings of IEEE Symposium on Security and Privacy, May 18, 2014, pp. 459-474.

Even, et al., "A Randomized Protocol for Signing Contracts", in Journal of Communications of the ACM, vol. 28, Issue 6, Jun. 1, 1985, pp. 637-647.

Kirovski, et al., "Spread-Spectrum Watermarking of Audio Signals", in Journal of IEEE Transactions on Signal Processing, vol. 51, Issue 4, Apr. 2003, pp. 1020-1033.

Naor, et al., "Efficient Oblivious Transfer Protocols", in Proceedings of the 12th Annual ACM-SIAM Symposium on Discrete Algorithms, Jan. 7, 2001, pp. 448-457.

Qureshi, et al., "Blockchain-Based P2P Multimedia Content Distribution Using Collusion-Resistant Fingerprinting", in Proceedings of Asia-Pacific Signal and Information Processing Association Annual Summit and Conference, Nov. 18, 2019, pp. 1606-1615.

First Office Action Received for Chinese Application No. 202010611319.3, mailed on Mar. 12, 2025, 23 pages. (English translation Provided).

Second Office Action Received for Chinese Application No. 202010611319.3, mailed on Aug. 7, 2025, 06 pages. (English translation Provided).

* cited by examiner

THIRD PARTY BASED PIRATED COPY TRACING

CROSS-REFERENCE TO RELATED APPLICATION

This application is a U.S. National Stage Filing under 35 U.S.C. 371 of International Patent Application Serial No. PCT/US2021/031464, filed May 10, 2021, and published as WO 2022/005609 A1 on Jan. 6, 2022, which application claims the benefit of priority to Chinese Patent Application No. 202010611319.3, filed Jun. 29, 2020, which applications and publication are incorporated herein by reference in their entirety.

BACKGROUND

The rapid development of the network has provided tremendous convenience for information exchange, and has also brought severe challenges to the protection of digital content (also referred to as "digital assets"). Piracy and illegal use of digital content have caused huge economic losses to content owners of digital content.

With the development of computer technology, watermarking technology has been gradually applied so as to protect the copyright of digital content. By identifying watermark information carried in digital content, it is possible to distinguish illegally copied and/or pirated digital content. However, due to characteristics of Internet dissemination, it is difficult for content owners to fully monitor whether their owned digital content are illegally pirated. Therefore, how to effectively trace pirated copies of digital content has become a focus.

SUMMARY

According to implementations of the subject matter described herein, a solution is provided for third party based pirated copy tracing. In the solution, a report on a pirated copy of a digital content is received from a third party, wherein the report comprises first secret information for characterizing a first identification, time information and tracing information of the pirated copy. Subsequently, a request for verifying the report is received for determining whether the report is valid. When the report is determined as valid, a licensee associated with the report is marked as a first status for indicating that the pirated copy might be leaked by the licensee. Therefore, the pirated copy may be effectively traced with the third parties. Besides, the tracing information in the report can be hidden, and other third parties can therefore be prevented from using the tracing information for duplicate reports.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs refer to the same or similar elements.

DETAILED DESCRIPTION

Figure 1:
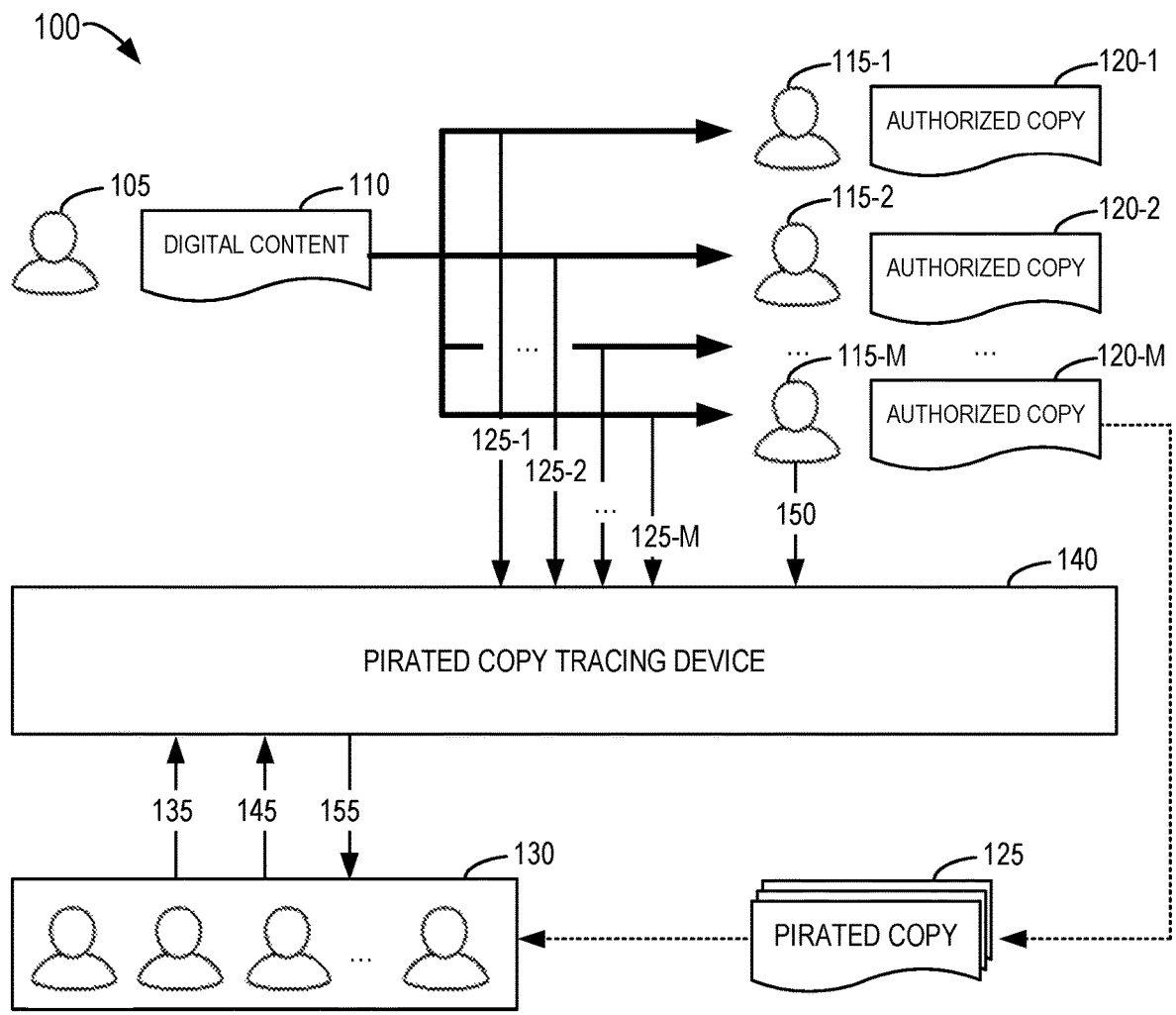
FIG. 1 illustrates a block diagram of a computing environment which can implement a plurality of implementations of the subject matter described herein.

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As discussed above, how to effectively trace pirated copies is one of core issues in copyright protection of digital content. Some traditional solutions require a content owner to detect copies on the network for determining whether there is illegal piracy of digital content. However, such an approach requires a large computation cost for the content owner, and the detection might not be thorough.

Other traditional solutions trace pirated copies of digital content by collecting third-party reports. However, on the one hand, such reports might not be transparent, and third parties might therefore not trust such a reporting mechanism and further lack motivation to report pirated copies. On the other hand, some content owners encourage third parties to report pirated copies by offering incentives to third parties. However, if such reports are transparent, then obviously other third parties may obtain details of reports. Some other third parties might use revealed reports to resubmit reports of pirated copies for obtaining inappropriate incentives. This will cause an unnecessary loss to content owners.

According to implementations of the subject matter described herein, a solution is provided for third party based pirated copy tracing. In the solution, a report on a pirated copy of a digital content is received from a third party, wherein the report comprises first secret information for characterizing a first identification, time information and tracing information (e.g., watermark information) of a pirated copy. For example, the first secret information may be determined through irreversible hash operations so that other third party cannot directly obtain the tracing information.

Subsequently, a request for verifying the report is received, so as to determine whether the report is valid. The request comprises second secret information and a second identification of the third party, wherein the second secret information is used to characterize the tracing information and the time information. It may be determined based on the received report and the request whether the report is valid, so that it may prevent other third parties from using the disclosed first secret information for a duplicate report. When it is determined that the report is valid, a licensee associated with the report is marked as a first status, so as to indicate that the pirated copy might be leaked by the licensee. Thus, the pirated copy may be effectively traced based on third parties. Further, the tracking information in the report can be hidden, and other third parties can be prevented from using the tracing information for a duplicate report.

Illustration is presented below to basic principles and several example implementations of the subject matter described herein with reference to the drawings.

Example Environment

FIG. 1 illustrates a block diagram of an environment 100 in which a plurality of implementations of the subject matter described herein can be implemented. It should be understood that the environment 100 shown in FIG. 1 is only exemplary and shall not constitute any limitation on the functions and scope of the implementations described by the subject matter described herein.

As shown in FIG. 1, the computing environment 100 includes a content owner 105, which is an owner of a digital content 110. The content owner 105 may be any individual, organization or institution, etc. The digital content 110 is any type of digital asset owned by the content owner 105, such as an image, a video, an audio, a document, a model, a software, etc. The subject matter described herein is not intended to limit the form of the digital content 110.

As shown in FIG. 1, the digital content 110 is shared to a plurality of licensees 115-1, 115-2 . . . 115-M (individually or collectively referred to as licensee 115). In order to facilitate tracing of a pirated copy, different tracing information (e.g., watermark) is added to the digital content 110 to thereby form a plurality of authorized copies 120-1, 120-2 . . . 120-M (individually or collectively referred to as authorized copy 120). As shown in FIG. 1, each licensee 115 will own a corresponding authorized copy 120.

In some implementations, to subsequently determine which licensee leaks the pirated copy, transmission evidences 125-1, 125-2 . . . 125-M (individually or collectively referred to as transmission evidence 125) characterizing that the authorized copy 120 is shared to the corresponding licensee 115 may be stored to a pirated copy tracing device 140.

In some implementations, to prevent the content owner 105 from maliciously framing a certain licensee 115 for leaking the corresponding authorized copy 120, the authorized copy 120 may be shared based on an oblivious transfer (OT) protocol. Accordingly, the corresponding transmission evidence 125 may comprise an OT evidence generated by the OT protocol.

During transmission based on the OT protocol, each licensee 115 will be provided with a plurality of candidate copies, and one candidate copy will be randomly selected by the licensee 115 as the authorized copy 120. In this way, the content owner 105 will be unable to know which copy is selected by the licensee 115.

As discussed above, without knowledge of the content owner 105, some licensees 115 might intentionally or unintentionally leak the authorized copy 120, thereby forming a spreading pirated copy 125. For example, without authorization, a certain authorized copy 120-M might be leaked and appear on a certain unauthorized forum for users to download. A copy on the forum for users to download will be referred to as the pirated copy 125.

As shown in FIG. 1, one or more third parties 130 might obtain the pirated copy 125. For some consideration, some third parties 130 may provide reports on the pirated copy 125 to the pirated copy tracing device 140. In some implementations, the content owner 105 may, for example, offer an incentive to a third party 130 who provides a valid report on the pirated copy 125, thereby encouraging the third parties 130 to report the obtained pirated copy 125 to the pirated copy tracing device 140.

According to implementations of the subject matter described herein, the third party 130 may first provide a report 135 on the pirated copy 125 to the pirated copy tracing device 140, and then in a subsequent appropriate time period submit a request 145 for verifying the report 135. After the report 135 is determined as valid by the pirated copy tracing device 140, the licensee 115 associated with the report 135 may be marked as possibly leaking the corresponding pirated copy 125. In some implementations, to motivate more third parties to proactively report pirated copies, the content owner 105 may offer to the third party 130 an incentive 155 corresponding to the report 135 through the pirated copy tracing device 140.

In some implementations, the pirated copy tracing device 140 may further receive an appeal request 150 from a doubted licensee 115. For example, the pirated copy tracing device 140 may use the maintained transmission evidence 125 to prove the authorized copy 120 actually obtained by the licensee 115, and then determine whether the licensee 115 is a leaker of the pirated copy 125 based on a comparison between the authorized copy 120 and the pirated copy 125.

It should be understood although the pirated copy tracing device 140 is shown as a separate box in FIG. 1, the pirated copy tracing device 140 may comprise an independent device or a group of devices connected via a network. In one example implementation of the subject matter described herein, the pirated copy tracing device 140 may comprise one or more nodes deployed on a blockchain (e.g., a public blockchain or a consortium blockchain).

A detailed discussion is presented below of example implementations of pirated copy tracing.

Tracing of Pirated Copy

Figure 2:
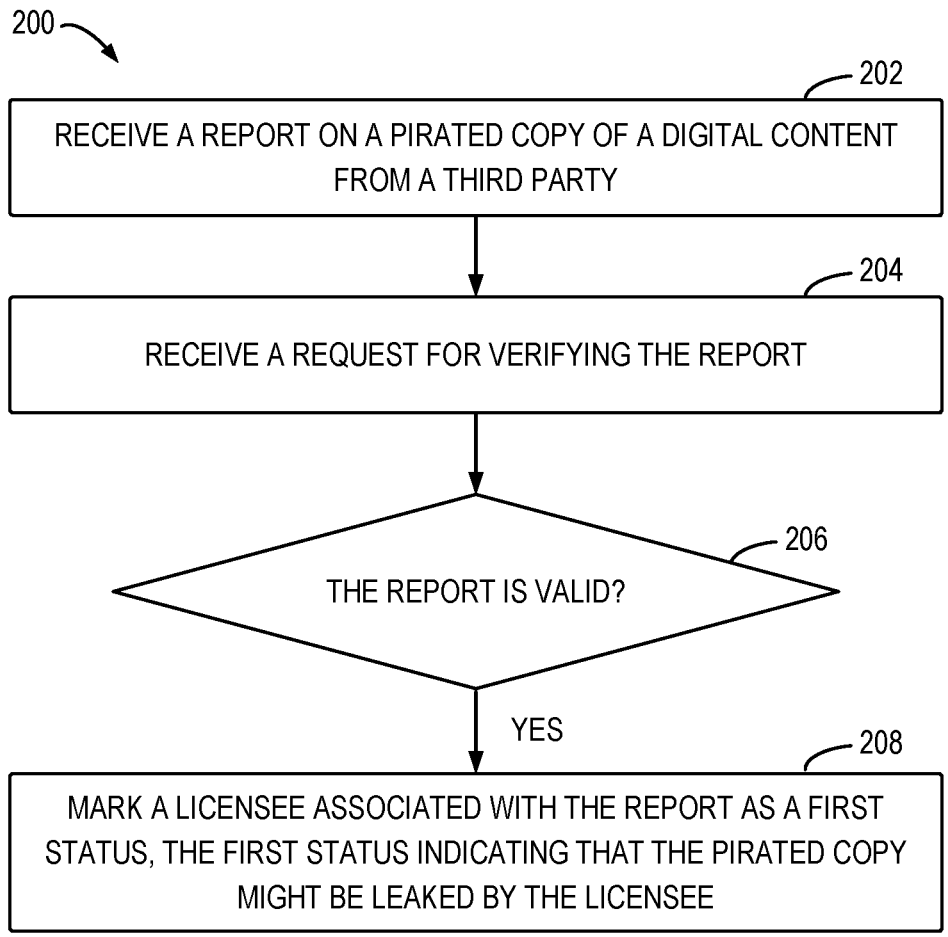
FIG. 2 illustrates a flowchart of an example process of tracing a pirated copy according to some implementations of the subject matter described herein.

FIG. 2 shows a flowchart of a process 200 of tracing a pirated copy according to some implementations of the subject matter described herein. The process 200 may be implemented by, for example, the pirated copy tracing device 140 in FIG. 1.

At 202, the pirated copy tracing device 140 receives, from a third party 130, a report 135 on a pirated copy 125 of a digital content 110, wherein the report 135 comprises first secret information, and the first secret information is for characterizing a first identification, time information and tracing information of the pirated copy 125. The time information indicates a creation time of the first secret information. The pirated copy 125 is a leaked copy of an authorized copy 120 of the digital content which is authorized to a licensee 115 by a content owner 105.

As discussed above, a third party 130 may obtain the pirated copy 125 in some cases. In some implementations, the third party 130 may extract the tracing information in the pirated copy 125 and may then generate the first secret information based on the tracing information. As an example, the tracing information may comprise watermark information included in the pirated copy 125, wherein the watermark information was added when the digital content 110 was shared by the content owner 105 to the licensee 115.

In some implementations, to prevent the tracing information from being leaked, during generating the report 135, the third party 130 may combine the tracing information and the time information and then perform a hash operation on the combined data to obtain a first hash value. Further, the third party 130 may combine the first hash value and identification of the third party and then perform a hash operation on the combined data to obtain a second hash value. The second hash value may be used as the first secret information.

In one example, the first secret information may be formulated as Formula (1):

$$\mathcal{H}(\mathcal{H}_{(id_{xy}\|T)\|pk_i^I})  \quad (1)$$

wherein $cm_1$ denotes the first secret information, $\mathcal{H}$ denotes a hash operation, $\|$ denotes linking two data, $id_{xy}$ denotes the tracing information, T denotes the time information, and $pk_i^I$ denotes the identification of the third party.

In some implementations, the time information T may be represented as a time period when the first secret information is created. Specifically, after the digital content 110 is shared, the content owner 105 may, for example, set a specific time window to allow for receiving reports from the third party 130 on the pirated copy 125 of the digital content 110.

In some implementations, the time window may further be divided into a plurality of time periods, and the time information T may represent a serial number of the time period during which the first secret information is created. For example, if the first secret information is created within the second time period, then the time information T may be determined as a value "2."

In some implementations, when generating the report 135, the third party 130 may further obtain a first index indicating the licensee 115 associated with the pirated copy 125 and a second index indicating the authorized copy 120 corresponding to the licensee 115 among a plurality of versions provided to the licensee 115. Specifically, the third party 130 may, for example, send the hash value of the tracing information to the content owner 105 so as to query the first index and the second index according to the tracing information.

In some implementations, the content owner 105 may maintain a hash table so as to indicate mapping relations among hash values of tracing information of different authorized copies 120, index values of corresponding licensees 115 and index values of authorized copies 120. By querying the hash table, the content owner 105 may return the first index and the second index corresponding to the tracing information in the pirated copy 125. As an example, the first index and the second index may be, for example, be included in the report 135 in plain text.

As an example, the report 135 may be formulated as Formula (2):

$$cm=(cm_1,cm_2,cm_3)= \mathcal{H}(\mathcal{H}_{(id_{xy}\|T)\|pk_i^I},x,y) \quad (2)$$

wherein cm denotes a report, which comprises a tuple ($cm_1$, $cm_2$, $cm_3$), and x and y denote the first index and the second index, respectively.

In some implementations, the pirated copy tracing device 140 may store the report 135 in a report list (e.g., represented as $CMList_T$) associated with a time period when the report 135 is received. In some implementations, to guarantee the transparency of the report, the pirated copy tracing device 140 may be a node deployed on a blockchain (e.g., a public blockchain or a consortium blockchain). The pirated copy tracing device 140 may maintain relevant information of the report 135 on the blockchain, so as to make the first secret information, the first index and the second index included in the report be available from the blockchain.

By storing the report 135 on the blockchain, the implementations of the subject matter described herein may reduce the risk that the report 135 sent by the third party 130 will be maliciously modified, thereby increasing the accuracy of pirated copy tracing. In addition, by using the tracing information, the time information and the identification to generate the first secret information, the implementations of the subject matter described herein may prevent the tracing information or the hash value thereof from being directly exposed to other third parties, thereby further preventing other third parties from maliciously generating a fake report by using the tracing information included in the report.

At 204, the pirated copy tracing device 140 receives a request 145 for verifying the report 135, wherein the request 145 comprises second secret information and a second identification of the third party 130, and the second secret information is for characterizing the tracing information and the time information.

In some implementations, the third party may submit the request 145 for verifying the report 135 to the pirated copy tracing device 140 in a predetermined time after sending the report 135. Specifically, as discussed above, the time window allowing for receiving the report from the third party 130 on the pirated copy 125 of the digital content 110 may be divided into a plurality of time periods. In some implementations, the third party 130 may send the request 145 in a time period after sending the report 135. Unlike the traditional approach of verifying the report after the expiration of the time window, by verifying the report 135 in time, the implementations of the subject matter described herein may provide a verification result of the report 135 to the third party in time. In addition, this can facilitate offering a timely incentive to the third party 130, so as to encourage the third party 13 to proactively report a pirated copy of the digital content.

In some implementations, to prevent other third parties from maliciously generating a fake report by using the disclosed report 135, the third party 130 may include the second secret information and the identification of the third party 130 in the request 145. As an example, the second secret information may be a hash value resulting from a hash operation on the combination of the tracing information and the time information. For example, the second secret information $rv_1$ may be formulated as Formula (3):

$$rv_1 = \mathcal{H}_{(id_{xy}\|T)} \quad (3)$$

Definitions of respective elements in Formula (3) may refer to Formulas (1) and (2).

In some implementations, the request 145 may further comprise path information, which indicates corresponding paths of the above first index, second index and event information in a Merk tree maintained by the content owner 105.

Specifically, in the data sharing phase, the content owner 105 may construct a Merk tree, wherein each licensee 115 comprises a plurality of nodes as shown by Formula (4).

$$\mathcal{H}(\mathcal{H}_{(id_{ij}\|1)\|i\|j}), \ldots, \mathcal{H}(\mathcal{H}_{(id_{ij}\|K)\|i\|j}) \quad (4)$$

wherein K denotes the number of time periods included in the time window, i denotes the index information of the licensee 115, j denotes the index information of the corresponding authorized copy 120 among N copies provided to the licensee 115.

In some implementations, when generating the report 135, the content owner 105 may further use the first index x, the second index y and the time information T to query the Merk tree so as to determine a path $\text{Path}_{xyT}$ corresponding to x, y and T and then send the path to the third party 130. Accordingly, the path may be included in the request 145. As an example, the request 145 may be formulated as Formula (5):

$$rv=(rv_1, rv_2, rv_3)=(\mathcal{H}(id_{xy}\|T), \text{Path}_{xyT}, pk_i^I) \quad (5)$$

wherein rv denotes the request 145, which comprises a tuple $(r_{v1}, r_{v2}, r_{v3})$, d denotes the tracing information, and $pk_i^I$ denotes the identification of the third party.

At 206, the pirated copy tracing device 140 determines whether report is valid according to the first secret information, the second secret information and the second identification.

In some implementations, the pirated copy tracing device 140 may determine whether the second identification included in the request 145 matches the identification of the third party who sends the request 145.

As discussed above, the pirated copy tracing device may be a node deployed on a blockchain. Therefore, the reports and requests sent by other third parties are transparent and available to all nodes and users on the blockchain.

On the one hand, some malicious third parties might directly copy content of a disclosed report and request which are verified from another third party and then submit the content as a new report and request. Accordingly, the pirated copy tracing device 140 may determine that plaintext identification included in the request fails to match the identification of the third party 130 sending the request, and further identify the report as invalid.

On the other hand, since the identification included in the request is plaintext information, some malicious third parties might replace identification in a previous request with their own identification. That is, a malicious third party might construct a new report 135 by copying the contents of a previous report and construct a new request 145 by replacing the identification in the corresponding request.

In some implementations, the pirated copy tracing device 140 may determine whether the second secret information and the second identification included in the request 145 match the first secret information included in the report 135, so as to determine whether the report 135 is valid.

Specifically, the pirated copy tracing device 140 may generate third secret information according to the second secret information and the identification. For example, the third secret information may be represented as $\mathcal{H}(rv_1\|rv_3)$, wherein definitions of $rv_1$ and $rv_3$ may refer to Formula (5).

Subsequently, if the first secret information matches the third secret information, then the pirated copy tracing device 140 may determine the report 135 as valid. On the contrary, the pirated copy tracing device 140 may determine the report 135 as invalid.

In some implementations, the pirated copy tracing device 140 may compare, based on a time period (e.g., T+1) when the request 145 is received, the third secret information with a first element in a tuple in a report list (e.g., $\text{CMList}_T$) associated with a previous time period (e.g., T), so as to determine whether there is the first secret information matching the third secret information. As an example, if the report list includes the first secret information which match the third secret information, the pirated copy tracing device 140 may determine the report 135 as valid. On the contrary, the first secret information which match the third secret information are not present in the list, then the pirated copy tracing device 140 may determine the report 135 as invalid.

Regarding the above cases where identification is replaced to construct the new malicious request 145, the pirated copy tracing device 140 may determine that the third secret information constructed based on the request 145 fail to match the first secret information included in the report 135, thereby identifying the report 135 as invalid.

Based on such an approach, the implementations of the subject matter described herein, under the premise that the report and request are transparent to the blockchain, can effectively identify a request and report faked by other third parties using a published request and report and further protect rights and interests of the content owner and licensee.

In some implementations, if the request 145 further comprises the path $\text{Path}_{xyT}$, then the pirated copy tracing device 140 may further query whether the path $\text{Path}_{xyT}$ indicates a valid path in the Merk tree maintained by the content owner 105. If the path $\text{Path}_{xyT}$ fails to indicate a valid path, then the pirated copy tracing device 140 may determine the report 135 as invalid. As an example, the Merk tree may be stored on the blockchain.

Further, if the path $\text{Path}_{xyT}$ indicates a valid path in the Merk tree, then the pirated copy tracing device 140 may, for example, further determine whether $\mathcal{H}(\mathcal{H}(rv_1)\|x\|y)$ is included in the corresponding path, wherein $rv_1$, x and y are information included in the report 135. If it is determined that $\mathcal{H}(\mathcal{H}(rv_1)\|x\|y)$ is not included in the corresponding path, then the pirated copy tracing device 140 may determine the report 135 as invalid. By using the Merk tree to maintain hash values corresponding to the tracing information, the first index, the second index and the time information, the embodiments of the subject matter described herein may further improve the security of the verification procedure of the report 135.

At 208, if the report 135 is determined as valid, the pirated copy tracing device 140 will mark the licensee 115 associated with the report 135 as a first status, which indicates the pirated copy might be leaked by the licensee.

For example, regarding the example in FIG. 1, the pirated copy 125 is associated with the licensee 115-M. If the report 135 is determined as valid, then the pirated copy tracing device 140 may, for example, mark the licensee 115-M as the first status.

With the above discussed method, the embodiments of the subject matter described herein achieve effective tracing of a pirated copy based on third parties. In addition, with the method of verification using a report and request, the embodiments of the subject matter described herein can further prevent fake reports being constructed using disclosed reports and requests by malicious third parties.

Incentive for Third Parties

The example procedure of pirated copy tracing according to the implementations of the subject matter described herein has been described above. In some implementations, if the report 135 is determined as valid, the pirated copy tracing device 140 may offer an incentive 155 corresponding to the report 135 to the third party 130. It should be understood that the incentive 155 may comprise any appropriate type of incentive, and the subject matter described herein is not intended to be limiting in this regard.

Some existing solutions offer equal incentives to reports 135 on the same pirated copy 125. As a result, the same third party will use the same pirated copy 125 to submit duplicate reports in multiple time periods by changing its identity, for obtaining multiple incentives. This will damage interests of the content owner and make it impossible to accurately estimate the number of pirated copies leaked by licensees.

In order to prevent the same third party from submitting duplicate reports on the same pirated copy 125 by modifying its identity, the pirated copy tracing device 140 may dynamically adjust an incentive available to the same pirated copy 125.

Specifically, an incentive for the third party 130 whose report 135 is verified as valid may be formulated as:

$$B(I_i, n) = -\xi_i + \sum_{j=i+1}^{n} \xi_j + c * 2^{-n+1} \tag{6}$$

wherein $B(I_i, n)$ denotes an incentive for the i-th third party to submit a report among n third parties who successfully submit reports, wherein $\{\xi_i\} \in \mathbb{R}^*_{\geq 0}$, $0 \leq \xi_i \leq 2*\xi_i \leq c*2^{-i+1}$, and $\xi_1 = 0$.

Based on such an approach, the incentive determined by the subject matter described herein may ensure that a total incentive obtained through repetitively submitting a report is less than an incentive obtained by submitting a report only once. In this way, it could effectively prevent a third party from repetitively reporting a duplicate report by modifying its identity.

Unlike the traditional approach of making statistics and offering incentives after the time window, to encourage the third party to submit a report, the implementations of the subject matter described herein may divide the incentive into two portions, wherein a first portion may be offered in a time period when the report is determined as valid, and a second portion may be offered after the time window expires.

Figure 3:
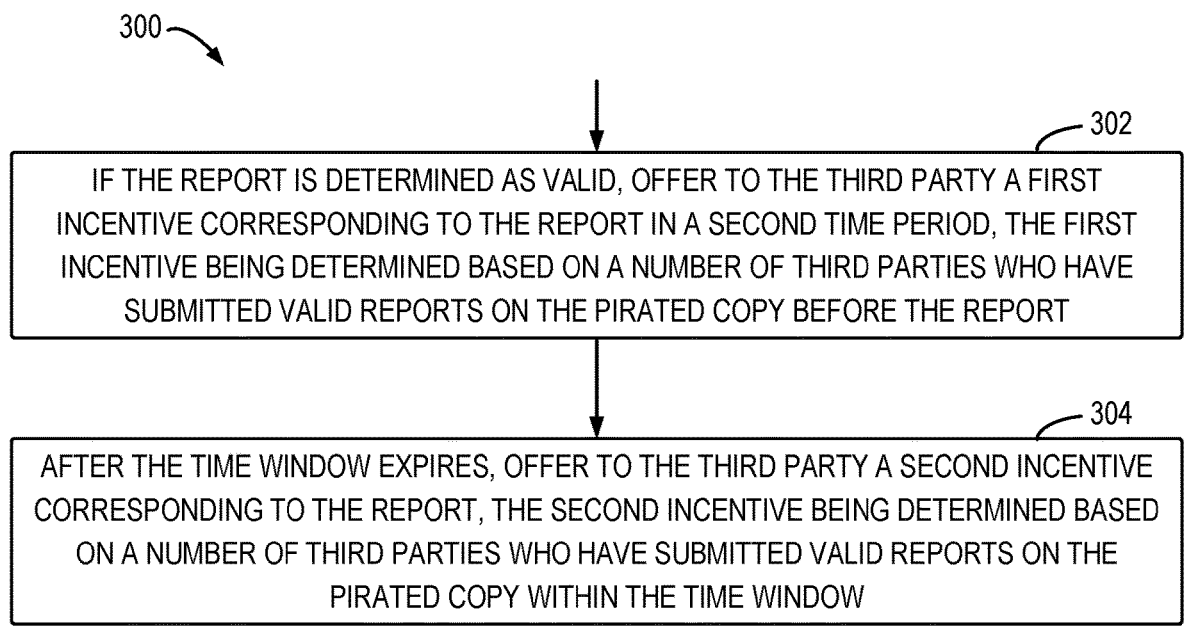
FIG. 3 illustrates a flowchart of an example procedure of offering an incentive to a third party according to some implementations of the subject matter described herein.

Description is presented below to a detailed process of providing an incentive with reference to FIG. 3. FIG. 3 shows a flowchart of an example process 300 of offering an incentive to a third party according to implementations of the subject matter described herein.

As shown in FIG. 3, at 302, if the report 135 is determined as valid, the pirated copy tracing device 140 may offer a first incentive corresponding to the report to the third party in a second time period, wherein the first incentive is determined based on the number of third parties who have submitted valid reports on the pirated copy before the report. The first incentive may be formulated as:

$$B_1(i) = 2 * \sum_{j=i}^{\infty} \Delta_j \tag{7}$$

wherein $\{\Delta_i\} \in \mathbb{R}^*_{\geq 0}$, and $$\xi_i + 1 = \frac{1}{2}\xi_i + \Delta_i.$$

For the definition of $\xi_i$, reference may be made to Formula (6).

At 304, after the time window expires, the pirated copy tracing device 140 may offer a second incentive corresponding to the report to the third party, wherein the second incentive is determined based on the number of third parties who have submitted valid reports on the pirated copy within the time window.

Accordingly, according to Formula (6), the pirated copy tracing device 140 may determine a total incentive which the third party is supposed to get, according to the number n of third parties who have submitted valid reports on the pirated copy within the time window and an order i in which the third party 130 submits the report. Subsequently, the pirated copy tracing device 140 may determine the second incentive to be offered, according to the total incentive and the first incentive determined by Formula (7).

In this way, the embodiments of the subject matter described herein may ensure that: (1) a report submitted earlier may be offered a larger incentive; (2) an incentive may be offered to the third party in time; (3) and an incentive for a repetitively submitted report will reduce.

Appeal of Licensee

In some implementations, after the licensee 115 is marked as a first status, the pirated copy tracing device 140 may further receive an appeal request 150 from the licensee 115.

In some implementations, the licensee 115 may submit the appeal request 150 to the pirated copy tracing device 140 within a predetermined time. If no appeal request 150 on the report 135 is received from the licensee 115 within the predetermined time after receipt of the report 135, the pirated copy tracing device 140 may mark the licensee 115 as a second status, which indicates that the pirated copy 125 is leaked by the licensee 115.

As discussed above, the authorized copy 120 is sent by the content owner 105 to the licensee 115 through an oblivious transfer OT protocol. In some implementations, the OT evidence 125 corresponding to the transfer may be maintained at the pirated copy tracing device 140. Specifically, the OT evidence 125 may be maintained on the blockchain to prevent it from being illegally tampered with by the third parties and thereby guarantee the accuracy of pirated copy tracing.

A flowchart of an example process 400 of appealing by the licensee according to some implementations of the subject matter described herein will be described in conjunction with FIG. 4.

Figure 4:
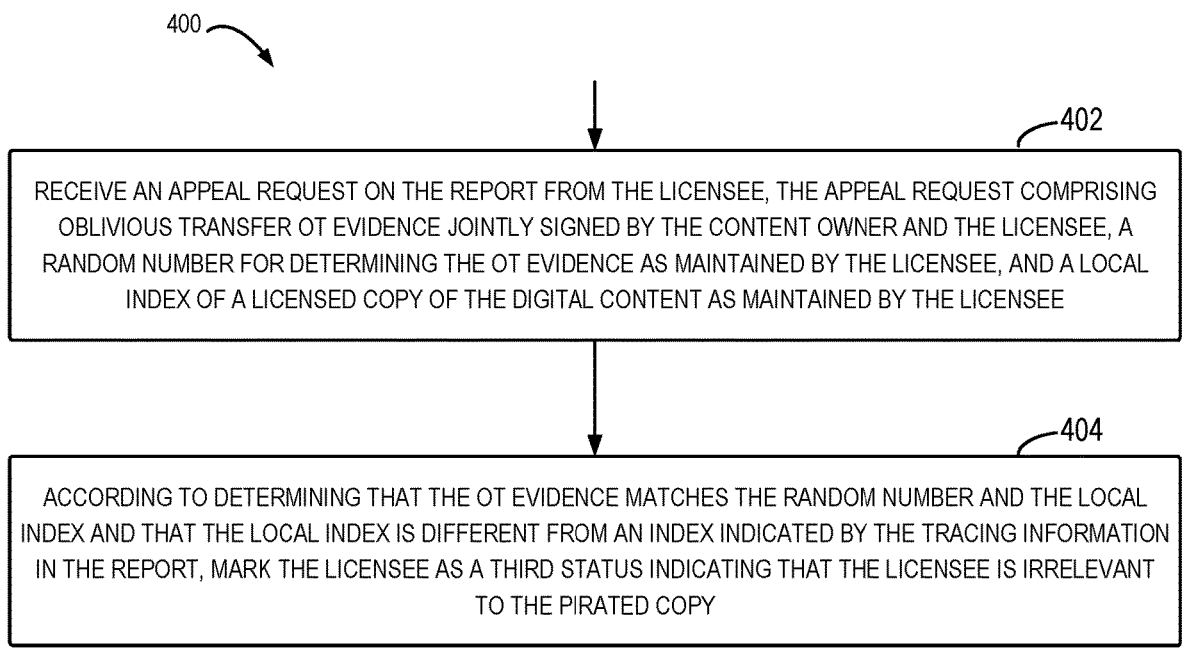
FIG. 4 illustrates a flowchart of an example process of a licensee making an appeal according to some implementations of the subject matter described herein.

As shown in FIG. 4, at 402, the pirated copy tracing device 140 may receive the appeal request 150 on the report 135 from the licensee 115, wherein the appeal request 150 comprises the OT evidence jointly signed by the content owner 105 and the licensee 115, a local random number for determining the OT evidence as maintained by the licensee 115, and a local index of the authorized copy as maintained by the licensee 115.

Specifically, the OT evidence may be formulated as:

$$R = P_l - r \cdot G \tag{8}$$

wherein, R denotes the OT evidence, $\{P_1, \ldots, P_N\} \in \mathbb{G}^N$, r is a random number determined by the licensee 115, l indicates an index of the authorized copy among N candidate copies provided to the licensee 115, $l \in [N]$, and N denotes the number of copies provided to the licensee 115. It should be understood that the OT evidence is generated based on OT protocol transfer data. Details about the OT protocol will not be detailed here.

Accordingly, the appeal request 150 may be represented as a tuple $((Sig_*(R), r, l))$, wherein $Sig_*(R)$ denotes the OT evidence signed with private keys of the content owner 105 and the licensee 115, respectively.

At 404, if the OT evidence matches the random number and the local index and that local index is different from an index indicated by the tracing information in the report, then the pirated copy tracing device 140 may mark the licensee 115 as a third status, wherein the third status indicates that the licensee is irrelevant to the pirated copy 125.

Specifically, the pirated copy tracing device 140 may determine whether Formula (9) is satisfied or not:

$$P_f - r \cdot G = R \qquad (9)$$

If Formula (9) is satisfied, then the pirated copy tracing device 140 may further compare 1 with $l_x$, wherein $l_x$ indicates the index indicated by the tracing information. If $l \neq l_x$, then the pirated copy tracing device 140 may determine that the appeal of the licensee 115 succeeds, and further mark the licensee 115 as irrelevant to the pirated copy 125.

On the contrary, if Formula (9) is not satisfied, or $l=l_x$, then the pirated copy tracing device 140 may determine that the appeal of the licensee 115 fails.

In some implementations, if the licensee 115 is marked as the first status within a predetermined time after the report 135 is received, then the pirated copy tracing device 140 may mark the licensee 115 as a second status, wherein the second status indicates that the pirated copy 125 is leaked by the licensee 115.

Unlike the traditional OT-based appeal process, the implementations of the subject matter described herein do not need to re-transmit transfer vectors (e.g., $\{E_1, \ldots, E_N\}$) associated with N candidate copies provided to the licensee. Only the above mentioned tuple is needed to be provided during the appeal procedure. Therefore, the complexity of the appeal may be reduced from O(N) to O(1), thereby greatly reducing network overheads and computation overheads required for the appeal.

Example Device

Figure 5:
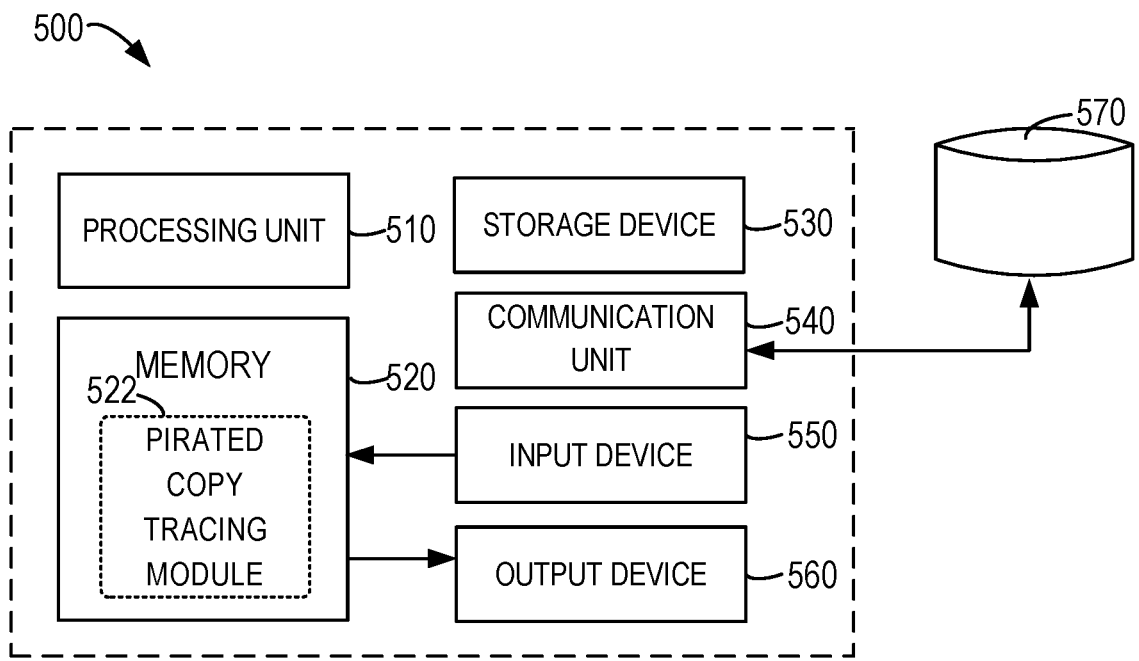
FIG. 5 illustrates a block diagram of an example computing device according to some implementations of the subject matter described herein.

FIG. 5 shows a schematic block diagram of an example device 500 which is applicable to implement the embodiments of the subject matter described herein. The device 500 may be used to implement the pirated copy tracing device 140 of FIG. 1. It should be understood that the device 500 shown in FIG. 5 is merely exemplary and should not form any limitation on the functions and scope of the implementations of the subject matter described herein. As shown in FIG. 1, components of the device 500 may include, without limitation to, one or more processors or processing units 510, a memory 520, a storage device 530, one or more communication units 540, one or more input devices 550, and one or more output devices 560.

In some implementations, the device 500 may be implemented as various user terminals or service terminals. The service terminals may be servers, large-scale computing devices, and the like provided by a variety of service providers. The user terminal, for example, is a mobile terminal, a fixed terminal or a portable terminal of any type, including a mobile phone, a multimedia computer, a multimedia tablet, Internet nodes, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. It may also be predicted that the device 500 can support any type of user-specific interface (such as a "wearable" circuit, and the like).

The processing unit 510 may be a physical or virtual processor and may execute various processing based on the programs stored in the memory 520. In a multi-processor system, a plurality of processing units executes computer-executable instructions in parallel to enhance parallel processing capability of the device 500. The processing unit 510 can also be known as a central processing unit (CPU), microprocessor, controller and microcontroller.

The device 500 usually includes a plurality of computer storage mediums. Such mediums may be any attainable medium accessible by the computing device 102, including but not limited to, a volatile and non-volatile medium, a removable and non-removable medium. The memory 520 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof. The memory 520 may include one or more pirated copy tracing modules 522, which are configured to perform various functions described herein. The pirated copy tracing module 522 may be accessed and operated by the processing unit 510 to realize corresponding functions. The storage device 530 may be a removable or non-removable medium, and may include a machine-readable medium (e.g., a memory, a flash drive, a magnetic disk) or any other medium, which may be used for storing information and/or data and be accessed within the device 500.

Functions of components of the device 500 may be realized by a single computing cluster or a plurality of computing machines, and these computing machines may communicate through communication connections. Therefore, the device 500 may operate in a networked environment using a logic connection to one or more other servers, a Personal Computer (PC) or a further general network node. The device 500 may also communicate through the communication unit 540 with one or more external devices (not shown) as required, where the external device, e.g., a data base 570, a further storage device, a server, a display device, and so on, communicates with one or more devices that enable users to interact with the device 500, or with any device (such as a network card, a modem, and the like) that enable the device 500 to communicate with one or more other computing devices. Such communication may be executed via an Input/Output (I/O) interface (not shown).

The input device 550 may be one or more various input devices, such as a mouse, a keyboard, a trackball, a voice-input device, and the like. The output device 560 may be one or more output devices, e.g., a display, a loudspeaker, a printer, and so on.

The device 500 may include a pirated copy tracing module 522 configured to: receive a report on a pirated copy of a digital content from a third party, the report comprising first secret information, the first secret information being used for characterizing first identification, time information and tracing information of the pirated copy, the time information indicating a creation time of the first secret information, the pirated copy being a leaked version of an authorized copy of the digital content which is authorized by a content owner to a licensee; receive a request for verifying the report, the request comprising second secret information and second identification of the third party, the second secret information being used for characterizing the tracing information and the time information; determine whether the report is valid according to the first secret information, the second secret information and the second identification; and if the report is determined as valid, mark a licensee associated with the report as first status, the first status indicating that the pirated copy might be leaked by the licensee.

Example Implementations

Some example implementations of the subject matter described herein are listed below.

In a first aspect, the subject matter described herein provides a computer-implemented method. The method comprises: receiving, from a third party, a report on a pirated copy of a digital content, the report comprising first secret information for characterizing a first identification, time information and tracing information of the pirated copy, the time information indicating a creation time of the first secret information, the pirated copy being a leaked version of an authorized copy of the digital content which is authorized by a content owner to a licensee; receiving a request for verifying the report, the request comprising second secret information and a second identification of the third party, the second secret characterizing the tracing information and the time information; determining whether the report is valid according to the first secret information, the second secret information and the second identification; and if the report is determined as valid, marking a licensee associated with the report as a first status, the first status indicating that the pirated copy might be leaked by the licensee.

In some implementations, the first secret information is a second hash value determined based on the first identification and a first hash value, the first hash value being determined based on the tracing information and the time information.

In some implementations, determining whether the report is valid according to the first secret information, the second secret information and the second identification comprises: generating third secret information according to the second secret information and the second identification; and if the first secret information matches the third secret information, determining that the report is valid.

In some implementations, the method further comprises: if an appeal request on the report fails to be received from the licensee within a predetermined time after receipt of the report, marking the licensee as a second status, the second status indicating that the pirated copy is leaked by the licensee.

In some implementations, the authorized copy is sent by the content owner to the licensee through an oblivious transfer OT protocol, the method further comprising: receiving an appeal request on the report from the licensee, the appeal request comprising an OT evidence jointly signed by the content owner and the licensee, a local random number for determining the OT evidence as maintained by the licensee, and a local index of the authorized copy as maintained by the licensee; and if the OT evidence fails to match the random number and the local index and the local index is different from an index indicated by the tracing information in the report, marking the licensee as a third status, the third status indicating that the licensee has nothing to do with the pirated copy.

In some implementations, the method further comprises: maintaining the first secret information and the OT evidence on a blockchain, so as to make the first secret information and the OT evidence be available from the blockchain.

In some implementations, a time window for receiving a report on a pirated copy is divided into a plurality of time periods, and receiving a request for verifying the report comprises: receiving a request for verifying the report in a second time period of the plurality of time periods neighboring a first time period for receiving the report.

In some implementations, the method further comprises: if the report is determined as valid, offering to the third party a first incentive corresponding to the report in the second time period, the first incentive being determined based on a number of third parties who have submitted valid reports on the pirated copy before the report; and after the time window expires, offering to the third party a second incentive corresponding to the report, the second incentive being determined based on a number of third parties who have submitted valid reports on the pirated copy within the time window.

In a second aspect, a device is provided. The device comprises: a processing unit; and a memory, coupled to the processing unit and having instruction stored thereon, the instructions, when executed by the processing unit, causing the device to perform acts, comprising: receiving, from a third party, a report on a pirated copy of a digital content, the report comprising first secret information for characterizing a first identification, time information and tracing information of the pirated copy, the time information indicating a creation time of the first secret information, the pirated copy being a leaked version of an authorized copy of the digital content which is authorized by a content owner to a licensee; receiving a request for verifying the report, the request comprising second secret information and a second identification of the third party, the second secret characterizing the tracing information and the time information; determining whether the report is valid according to the first secret information, the second secret information and the second identification; and if the report is determined as valid, marking a licensee associated with the report as a first status, the first status indicating that the pirated copy might be leaked by the licensee.

In some implementations, the first secret information is a second hash value determined based on the first identification and a first hash value, the first hash value being determined based on the tracing information and the time information.

In some implementations, determining whether the report is valid according to the first secret information, the second secret information and the second identification comprises: generating third secret information according to the second secret information and the second identification; and if the first secret information matches the third secret information, determining that the report is valid.

In some implementations, the acts further comprise: if an appeal request on the report fails to be received from the licensee within a predetermined time after receipt of the report, marking the licensee as a second status, the second status indicating that the pirated copy is leaked by the licensee.

In some implementations, the authorized copy is sent by the content owner to the licensee through an oblivious transfer OT protocol, the acts further comprising: receiving an appeal request on the report from the licensee, the appeal request comprising an OT evidence jointly signed by the content owner and the licensee, a local random number for determining the OT evidence as maintained by the licensee, and a local index of the authorized copy as maintained by the licensee; and if the OT evidence fails to match the random number and the local index and the local index is different from an index indicated by the tracing information in the report, marking the licensee as a third status, the third status indicating that the licensee has nothing to do with the pirated copy.

In some implementations, the acts further comprise: maintaining the first secret information and the OT evidence on a blockchain, so as to make the first secret information and the OT evidence be available from the blockchain.

In some implementations, a time window for receiving a report on a pirated copy is divided into a plurality of time periods, and receiving a request for verifying the report comprises: receiving a request for verifying the report in a second time period of the plurality of time periods neighboring a first time period for receiving the report.

In some implementations, the acts further comprise: if the report is determined as valid, offering to the third party a first incentive corresponding to the report in the second time period, the first incentive being determined based on a number of third parties who have submitted valid reports on the pirated copy before the report; and after the time window expires, offering to the third party a second incentive corresponding to the report, the second incentive being determined based on a number of third parties who have submitted valid reports on the pirated copy within the time window.

In a third aspect, a computer program product is provided. The computer program product is tangibly stored in a non-transitory computer storage medium and comprises machine-executable instructions which, when executed by a device, cause the device to perform acts, comprising: receiving, from a third party, a report on a pirated copy of a digital content, the report comprising first secret information for characterizing a first identification, time information and tracing information of the pirated copy, the time information indicating a creation time of the first secret information, the pirated copy being a leaked version of an authorized copy of the digital content which is authorized by a content owner to a licensee; receiving a request for verifying the report, the request comprising second secret information and a second identification of the third party, the second secret characterizing the tracing information and the time information; determining whether the report is valid according to the first secret information, the second secret information and the second identification; and if the report is determined as valid, marking a licensee associated with the report as a first status, the first status indicating that the pirated copy might be leaked by the licensee.

In some implementations, the first secret information is a second hash value determined based on the first identification and a first hash value, the first hash value being determined based on the tracing information and the time information.

In some implementations, determining whether the report is valid according to the first secret information, the second secret information and the second identification comprises: generating third secret information according to the second secret information and the second identification; and if the first secret information matches the third secret information, determining that the report is valid.

In some implementations, the acts further comprise: if an appeal request on the report fails to be received from the licensee within a predetermined time after receipt of the report, marking the licensee as a second status, the second status indicating that the pirated copy is leaked by the licensee.

In some implementations, the authorized copy is sent by the content owner to the licensee through an oblivious transfer OT protocol, the acts further comprising: receiving an appeal request on the report from the licensee, the appeal request comprising an OT evidence jointly signed by the content owner and the licensee, a local random number for determining the OT evidence as maintained by the licensee, and a local index of the authorized copy as maintained by the licensee; and if the OT evidence fails to match the random number and the local index and the local index is different from an index indicated by the tracing information in the report, marking the licensee as a third status, the third status indicating that the licensee has nothing to do with the pirated copy In some implementations, the acts further comprise: maintaining the first secret information and the OT evidence on a blockchain, so as to make the first secret information and the OT evidence be available from the blockchain.

In some implementations, a time window for receiving a report on a pirated copy is divided into a plurality of time periods, and receiving a request for verifying the report comprises: receiving a request for verifying the report in a second time period of the plurality of time periods neighboring a first time period for receiving the report.

In some implementations, the acts further comprise: if the report is determined as valid, offering to the third party a first incentive corresponding to the report in the second time period, the first incentive being determined based on a number of third parties who have submitted valid reports on the pirated copy before the report; and after the time window expires, offering to the third party a second incentive corresponding to the report, the second incentive being determined based on a number of third parties who have submitted valid reports on the pirated copy within the time window.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatuses, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this subject matter described herein, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
receiving, from a third party, a report on a pirated copy of a digital content, the report comprising first secret information for characterizing a first identification, time information and tracing information of the pirated copy, the time information indicating a creation time of the first secret information, the pirated copy being a leaked version of an authorized copy of the digital content which is authorized by a content owner to a licensee determined from a first index retrieved using a hash value of the tracing information;
receiving a request for verifying the report, the request comprising second secret information and a second identification of the third party, the second secret information characterizing the tracing information and the time information;
determining whether the report is valid by evaluating the first secret information, the second secret information, and the second identification using records from a distributed ledger; and
if the report is determined as valid, storing an evidence record associated with the report in the distributed ledger and updating a status record of the licensee in the distributed ledger with a first status, the first status indicating an inference that the pirated copy was leaked by the licensee.

2. The method of claim 1, wherein the first secret information is a second hash value determined based on the first identification and a first hash value, the first hash value being determined based on the tracing information and the time information.

3. The method of claim 1, wherein determining whether the report is valid according to the first secret information, the second secret information and the second identification comprises:
generating third secret information according to the second secret information and the second identification; and
if the first secret information matches the third secret information, determining that the report is valid.

4. The method of claim 1, further comprising:
if an appeal request on the report fails to be received from the licensee within a predetermined time after receipt of the report, marking the licensee as a second status, the second status indicating that the pirated copy is leaked by the licensee.

5. The method of claim 1, wherein the authorized copy is sent by the content owner to the licensee through an oblivious transfer (OT) protocol, the method further comprising:
receiving an appeal request on the report from the licensee, the appeal request comprising an OT evidence jointly signed by the content owner and the licensee, a local random number for determining the OT evidence as maintained by the licensee, and a local index of the authorized copy as maintained by the licensee; and
if the OT evidence fails to match the random number and the local index and the local index is different from an index indicated by the tracing information in the report, marking the licensee as a third status, the third status indicating that the licensee has nothing to do with the pirated copy.

6. The method of claim 5, further comprising:
maintaining the first secret information and the OT evidence on the distributed ledger, so as to make the first secret information and the OT evidence be available from the distributed ledger.

7. The method of claim 1, wherein a time window for receiving a report on a pirated copy is divided into a plurality of time periods, and wherein receiving a request for verifying the report comprises:
receiving a request for verifying the report in a second time period of the plurality of time periods neighboring a first time period for receiving the report.

8. The method of claim 7, further comprising:
if the report is determined as valid, offering to the third party a first incentive corresponding to the report in the second time period, the first incentive being determined based on a number of third parties who have submitted valid reports on the pirated copy before the report; and
after the time window expires, offering to the third party a second incentive corresponding to the report, the second incentive being determined based on a number of third parties who have submitted valid reports on the pirated copy within the time window.

9. A device, comprising:
a processing unit; and
a memory coupled to the processing unit and having instructions stored thereon which, when executed by the processing unit, cause the device to perform acts comprising:
receiving, from a third party, a report on a pirated copy of a digital content, the report comprising first secret information for characterizing a first identification, time information and tracing information of the pirated copy, the time information indicating a creation time of the first secret information, the pirated copy being a leaked version of an authorized copy of the digital content which is authorized by a content owner to a licensee determined from a first index retrieved using a hash value of the tracing information;
receiving a request for verifying the report, the request comprising second secret information and a second identification of the third party, the second secret information characterizing the tracing information and the time information;
determining whether the report is valid by evaluating the first secret information, the second secret information and the second identification using records from a distributed ledger; and
if the report is determined as valid storing an evidence record associated with the report in the distributed ledger and updating a status record of the licensee in the distributed ledger with a first status, the first status indicating an inference that the pirated copy was leaked by the licensee.

10. The device of claim 9, wherein the first secret information is a second hash value determined based on the first identification and a first hash value, the first hash value being determined based on the tracing information and the time information.

11. The device of claim 9, wherein determining whether the report is valid according to the first secret information, the second secret information and the second identification comprises:
generating third secret information according to the second secret information and the second identification; and
if the first secret information matches the third secret information, determining that the report is valid.

12. The device of claim 9, the acts further comprising:
if an appeal request on the report fails to be received from the licensee within a predetermined time after receipt of the report, marking the licensee as a second status, the second status indicating that the pirated copy is leaked by the licensee.

13. The device of claim 9, wherein the authorized copy is sent by the content owner to the licensee through an oblivious transfer (OT) protocol, the acts further comprising:
receiving an appeal request on the report from the licensee, the appeal request comprising an OT evidence jointly signed by the content owner and the licensee, a local random number for determining the OT evidence as maintained by the licensee, and a local index of the authorized copy as maintained by the licensee; and
if the OT evidence fails to match the random number and the local index and the local index is different from an index indicated by the tracing information in the report, marking the licensee as a third status, the third status indicating that the licensee has nothing to do with the pirated copy.

14. The device of claim 13, the acts further comprising:
maintaining the first secret information and the OT evidence on the distributed ledger, so as to make the first secret information and the OT evidence be available from the distributed ledger.

15. At least one non-transitory machine-readable medium comprising machine-executable instructions which, when executed by a device, cause the device to perform operations to:
receive, from a third party, a report on a pirated copy of a digital content, the report comprising first secret information for characterizing a first identification, time information and tracing information of the pirated copy, the time information indicating a creation time of the first secret information, the pirated copy being a leaked version of an authorized copy of the digital content which is authorized by a content owner to a licensee determined from a first index retrieved using a hash value of the tracing information;
receive, a request for verifying the report, the request comprising second secret information and a second identification of the third party, the second secret information characterizing the tracing information and the time information;
determine whether the report is valid by evaluating the first secret information, the second secret information and the second identification using records from a distributed ledger; and
if the report is determined as valid, storing an evidence record associated with the report in the distributed ledger and updating a status record of the licensee in the distributed ledger with a first status, the first status indicating an inference that the pirated copy was leaked by the licensee.

16. The at least one non-transitory machine-readable medium of claim 15, wherein the first secret information is a second hash value determined based on the first identification and a first hash value, the first hash value being determined based on the tracing information and the time information.

17. The at least one non-transitory machine-readable medium of claim 15, the machine-executable instructions to determine whether the report is valid according to the first secret information, the second secret information and the second identification further comprising machine-executable instructions that cause the device to perform operations to:
generate third secret information according to the second secret information and the second identification; and
if the first secret information matches the third secret information, determine that the report is valid.

18. The at least one non-transitory machine-readable medium of claim 15, further comprising machine-executable instructions that cause the device to perform operations to:
if an appeal request on the report fails to be received from the licensee within a predetermined time after receipt of the report, mark the licensee as a second status, the second status indicating that the pirated copy is leaked by the licensee.

19. The at least one non-transitory machine-readable medium of claim 15, wherein the authorized copy is sent by the content owner to the licensee through an oblivious transfer (OT) protocol and further comprising machine-executable instructions that cause the device to perform operations to:
receive an appeal request on the report from the licensee, the appeal request comprising an OT evidence jointly signed by the content owner and the licensee, a local random number for determining the OT evidence as maintained by the licensee, and a local index of the authorized copy as maintained by the licensee; and
if the OT evidence fails to match the random number and the local index and the local index is different from an index indicated by the tracing information in the report, mark the licensee as a third status, the third status indicating that the licensee has nothing to do with the pirated copy.

20. The at least one non-transitory machine-readable medium of claim 19, further comprising machine-executable instructions that cause the device to perform operations to:
maintain the first secret information and the OT evidence on the distributed ledger, so as to make the first secret information and the OT evidence be available from the distributed ledger.

* * * * *